J. M. LAMB.
TOOL HOLDER OR TOOL.
APPLICATION FILED MAY 19, 1919.
1,336,466.
Patented Apr. 13, 1920.
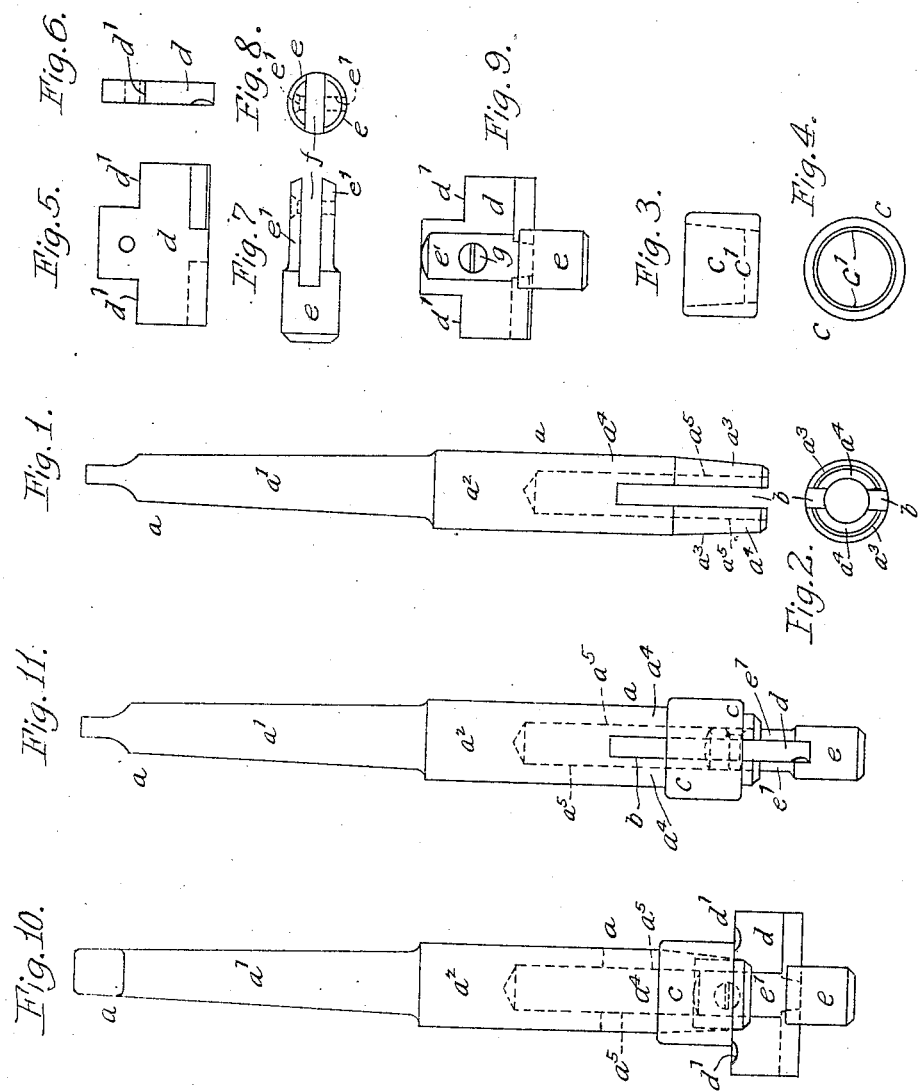
Inventor
Joseph Mundle Lamb,
By
Attorneys

UNITED STATES PATENT OFFICE.

JOSEPH MUNDLE LAMB, OF FAZAKERLEY, NEAR LIVERPOOL, ENGLAND.

TOOL-HOLDER OR TOOL.

1,336,466.  Specification of Letters Patent.  Patented Apr. 13, 1920.

Application filed May 19, 1919. Serial No. 298,322.

*To all whom it may concern:*

Be it known that I, JOSEPH MUNDLE LAMB, a subject of the King of England, residing at West View, Moor Park, Fazakerley, near Liverpool, in the county of Lancaster, England, manufacturing engineer, have invented certain new and useful Improvements in or Relating to Tool-Holders or Tools, of which the following is a specification.

This invention relates to tool holders and tools (particularly tools which or shanks or extensions whereof are flat); and has for its object to provide in combination, a tool holder which shall be simple in construction, and permit of the ready fitment and removal of a tool, and a tool which is so formed or constructed that it will become locked or secured to the holder in the act of being positioned therein.

My invention consists in the combination of:—A tool holder which comprises a body portion, a part whereof is adapted to be secured to a drilling machine, lathe or other machine tool or device, and a part which is of tapering or conical shape or configuration and is also bifurcated by the formation of a longitudinal slot or gap; a sleeve or collar adapted to slide and fit upon said tapering or conical exterior face of the slotted part of said body, the interior face of which sleeve or collar being tapered to correspond with the exterior face of said slotted body part; and a tool which is characterized by the possession of a part or parts adapted to enter said body slot and engage with said sleeve or collar, so that when the tool is applied to the holder it will contact with and displace said sleeve or collar which—in turn—will force the two "spring" body limbs or members formed by the creation of said slot inwardly *i. e.* toward each other, so causing them to grip and hold the portion of the tool which has entered said slot, and to continue to do so unless and until said sleeve or collar is withdrawn to permit of the release of the tool.

In some cases, I may combine with said holder and tool, a pilot or centering arbor, to accommodate which the interior faces of said body limbs or members are recessed.

In a preferred construction, said pilot is cylindrical in shape and embraces a part of the tool through the provision of a longitudinal slot therein.

I will further describe my invention with the aid of the accompanying sheet of explanatory drawings, which illustrate, by way of example only, one mode of embodying same.

In said drawings:—

Figure 1 represents in elevation the body portion of the holder, and Fig. 2 is an inverted plan.

Figs. 3 and 4 are, respectively, elevation and end view of the tool-securing sleeve or collar.

Figs. 5 and 6 are, respectively, elevation and end view of a cutter tool suitable for use with the holder.

Figs. 7 and 8 are, respectively, elevation and end view of a pilot or centering arbor.

Fig. 9 is an elevation of said pilot and cutter when assembled together; and

Figs. 10 and 11 illustrate, in elevations, drawn at right angles to each other, the holder, complete with tool and pilot.

$a$ generally designates the body of the holder of which the part $a^1$ is adapted to be fitted to a drilling machine or other device, and the part $a^2$ is tapered at $a^3$ and longitudinally slotted at $b$. $c$ denotes a sleeve or collar of which the interior face $c^1$ is tapered to correspond with the "taper" $a^3$ of the body $a$, so that when said sleeve or collar $c$ is passed on to the tapered portion $a^3$ of the body and displaced forwardly, the limbs or members $a^4$, $a^4$ created by the bifurcation of said body will be pressed inwardly *i. e.* toward each other, and so caused to grip that portion of the cutter $d$ which has entered slot $b$. $e$ denotes a cylindrical pilot or centering arbor wherein is formed a slot $f$ designed to receive part of cutter $d$, and being preferably secured to the cutter by means of a screw $g$ or rivet.

For the purpose of receiving the tool-embracing portions $e^1$, $e^1$ of said pilot, recesses $a^5$, $a^5$ are formed in the limbs or members $a^4$, $a^4$ of said holder body.

In fitting the tool $d$ to the holder—the sleeve or collar $c$ being placed on the tapered portion of the body $a^3$ tool $d$ (with pilot attached) is positioned in alinement with body slot $b$ and a part then driven into said slot in any convenient manner, as by striking the outer end of the pilot with a hammer. The tool embracing portion of the pilot also enters the body recesses $a^5$, $a^5$. In their travel the shoulders $d^1$, $d^1$ of tool $d$ contact with the lower face of said sleeve or collar $c$ and displace it forwardly, whereupon, due to the co-acting tapered portions of said body and sleeve, said body limbs or members $a^4$, $a^4$ are forced toward each other and grip that portion of the tool which then lies in slot $b$, as also the part of the pilot which has entered the body recesses $a^5$, $a^5$. The tool $d$ is now securely locked in the holder, and is released by forcing the sleeve or collar backward.

It is, of course, to be understood that I do not confine myself to the particular form of construction of tool illustrated in the drawing, which is shown as an example only. Any suitable cutter or other tool may be used provided it is characterized by the possession of a part or parts adapted to engage and actuate said sleeve or collar and is of a width within the "spring" gripping capacity of said body limbs or members $a^4$, $a^4$.

It is also to be understood that when the pilot or centering arbor is not required, said limb recesses $a^5$, $a^5$ may be omitted. Further, the part of the holder which it is required to secure to the machine or other device will be of any desired shape or configuration.

Having now described my invention, what I claim as new, and desire to secure by Letters Patent is:—

1. In combination, a tool holder which comprises a body portion, a part whereof is adapted to be secured to a drilling machine, lathe or other machine tool or device, and a part which is of tapering or conical shape and is also bifurcated by the formation of a longitudinal slot; a sleeve adapted to slide and fit upon said tapering exterior face of the slotted body part, the interior face of which sleeve being tapered correspondingly with the exterior face of said slotted body part; and a tool characterized by the possession of a part or parts adapted to enter said body slot and engage with said sleeve so that when the tool is applied to the holder it will contact with and displace said sleeve which—in turn—will force the two "spring" body limbs formed by the creation of said slot inwardly, i. e. toward each other, so causing them to grip the portion of the tool which has entered said slot, and to continue to do so until said sleeve is withdrawn to permit of the release of the tool.

2. In combination, a tool holder which comprises a body portion, a part whereof is adapted to be secured to a drilling machine, lathe, or other machine tool or device, and a part which is of tapering or conical shape and is also bifurcated by the formation of a longitudinal slot; recesses adapted to receive a pilot, formed in the "spring" body limbs created by the provision of said longitudinal slot; a sleeve adapted to slide and fit upon said tapering exterior face of the slotted body part, the interior face of which sleeve being tapered correspondingly with the exterior face of said slotted body part; and a tool characterized by possession of a part or parts adapted to enter said body slot and engage with said sleeve, so that when the tool is applied to the holder it will contact with and displace said sleeve which—in turn—will force the two "spring" body limbs inwardly, i. e. toward each other, for the purpose specified.

3. In combination, a tool holder, which comprises a body portion, a part whereof is adapted to be secured to a drilling machine, lathe, or other machine tool or device, and a part which is of tapering or conical shape and is also bifurcated by the formation of a longitudinal slot; recesses adapted to receive a pilot, formed in the "spring" body limbs created by the provision of said longitudinal slot; a sleeve adapted to slide and fit upon said tapering exterior face of the slotted body part, the interior face of which sleeve being tapered correspondingly with the exterior face of said slotted body parts; a tool characterized by the possession of a part or parts adapted to enter said body slot and engage with said sleeve so that when the tool is applied to the holder it will contact with and displace said sleeve which—in turn— will force the two "spring" body limbs inwardly, i. e. toward each other; and a pilot adapted to embrace a part of the tool.

In testimony whereof I affix my signature in the presence of two witnesses.

JOSEPH MUNDLE LAMB.

Witnesses:
 EMILY BURNETT,
 FANNY SNODDON.